United States Patent
Liao et al.

(10) Patent No.: US 7,959,003 B2
(45) Date of Patent: Jun. 14, 2011

(54) AIR ENCLOSURE AND CHECK VALVE THEREOF CAPABLE OF BEING FILLED WITH HIGH PRESSURE AIR

(75) Inventors: Chieh Hua Liao, Sindian (TW); Yaw Shin Liao, Sindian (TW); Kao Hsiung Liao, Sindian (TW)

(73) Assignee: Kao Hsiung Liao, Sindian (TW)

( * ) Notice: Subject to any disclaimer, the term of this patent is extended or adjusted under 35 U.S.C. 154(b) by 522 days.

(21) Appl. No.: 12/198,822

(22) Filed: Aug. 26, 2008

(65) Prior Publication Data
US 2009/0238496 A1 Sep. 24, 2009

(30) Foreign Application Priority Data
Mar. 21, 2008 (TW) ................ 97110266 A (51) Int. Cl.
*B65D 81/02* (2006.01)
(52) U.S. Cl. ...................................... 206/522
(58) Field of Classification Search .................. 206/522, 206/816; 383/3; 137/511
See application file for complete search history.

(56) References Cited

U.S. PATENT DOCUMENTS

| | | | | |
|---|---|---|---|---|
| 5,178,281 A | * | 1/1993 | Enzu | 206/522 |
| 5,845,806 A | * | 12/1998 | Parchman | 220/739 |
| 2008/0156420 A1 | * | 7/2008 | Liao et al. | 156/182 |
| 2008/0159659 A1 | * | 7/2008 | Liao et al. | 383/3 |

FOREIGN PATENT DOCUMENTS

| | | |
|---|---|---|
| CN | 101037156 A | 9/2007 |
| JP | 2006-117311 A | 11/2010 |
| TW | M327855 | 3/2008 |

* cited by examiner

*Primary Examiner* — Jacob K Ackun, Jr.
(74) *Attorney, Agent, or Firm* — Apex Juris, pllc; Tracy M. Heims (57) ABSTRACT

In an air enclosure and a check valve capable of being filled with high pressure air, two first inner films are installed between two outer films, and two second inner films are then stacked together between the two first inner film. The two outer films and the two first inner films are adhered together by means of hot sealing to allow the two first inner films to be positioned between the two outer films and an air cylinder to be formed between the two outer films; the two second inner films are adhered to each other by means of hot sealing to form a second air inlet between the two second inner films. Thereafter, an air filling tool may be used to force high pressure air into the second air inlet and into the air cylinder, causing the air cylinder to fill with air and expand.

19 Claims, 11 Drawing Sheets

AIR ENCLOSURE AND CHECK VALVE THEREOF CAPABLE OF BEING FILLED WITH HIGH PRESSURE AIR

CROSS-REFERENCES TO RELATED APPLICATIONS

This non-provisional application claims priority under 35 U.S.C. §119(a) on Patent Application No(s). 97110266 filed in Taiwan, R.O.C. on Mar. 21, 2008, the entire contents of which are hereby incorporated by reference.

FIELD OF THE INVENTION

The present invention relates to an air enclosure and a check valve thereof, and more particularly to an air enclosure capable of being filled with high pressure air and a check valve thereof.

BACKGROUND

When large-scale articles are placed in a container for transportation, cushioning air bags will be placed in among the articles so as to protect the articles from impact during transportation to avoid scratching and damage and to increase efficiency during transportation.

However, the volume of such a cushioning air bag always is very large (in order to provide a good cushioning effect), such that a lot of time needs to be spent to fill it with air; it is rather time and labor wasting. If a cushioning air bag is filled with high pressure gas, breakage of the air bag's check valve is easily caused, making it impossible to retain the air; or the outer film of the air bag is broken, causing air leakage. Moreover, such a cushioning bag is commonly scratched and damaged by a sharp or acute angle of the article in the container, causing air in the cushioning air bag to leak and reducing the cushioning protection effect, which will usually not be discovered until the article is taken out of the container. In the meantime, the article is scratched or damaged because of the lack of a cushioning medium during transportation.

SUMMARY OF THE INVENTION

To improve a cushioning air bag and the check valve thereof, increasing the air filling speed to reduce the time needed to fill the cushioning air bag with air, and further solve the problem of the cushioning air bag being scratched easily by a sharp angle or acute angle of an article in a container (causing air to leak and reducing the cushioning protection effect), by improving the structure of the cushioning air bag, the present invention is proposed.

The present invention proposes an air enclosure capable of being filled with high pressure air, including:
two outer films;
at least one air cylinder, formed between the two outer films by adhering the two outer films to each other by means of hot sealing;
two first inner films, placed in between the two outer films, parts of the two inner films projecting from the air cylinder;
two second inner films, placed in between the two first inner films; and
at least one second air inlet, formed between the two second inner films by adhering the two second inner films to each other by means of hot sealing, high pressure air entering the second air inlet and then the air cylinder through an air filling tool, causing the air cylinder to fill with air and expand.

The present invention also proposes a check valve capable of being filled with high pressure air, assembled in at least one air cylinder and formed by adhering the two outer films by means of hot sealing. The check valve includes:
two first inner films, placed in the two outer films; parts of the two first inner films being exposed out of the air cylinder;
two second inner films, placed in between the two first inner films; and
at least one second air inlet, formed between the two second inner films by adhering the two second inner films by means of hot sealing, high pressure air entering the second air inlet and then the air cylinder through an air filling tool, causing the air cylinder to fill with air and expand.

The present invention uses the two first inner films and the two second inner films stacked together to constitute the check valve, where the two second inner films are stacked between the two first inner films so that high pressure air may enter the air cylinder, causing the air cylinder to fill with air and expand. Breakage of the check valve by high pressure while air is entering will not occur, the air can be retained can be achieved, and the air filling speed can further be increased to reduce the time required.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
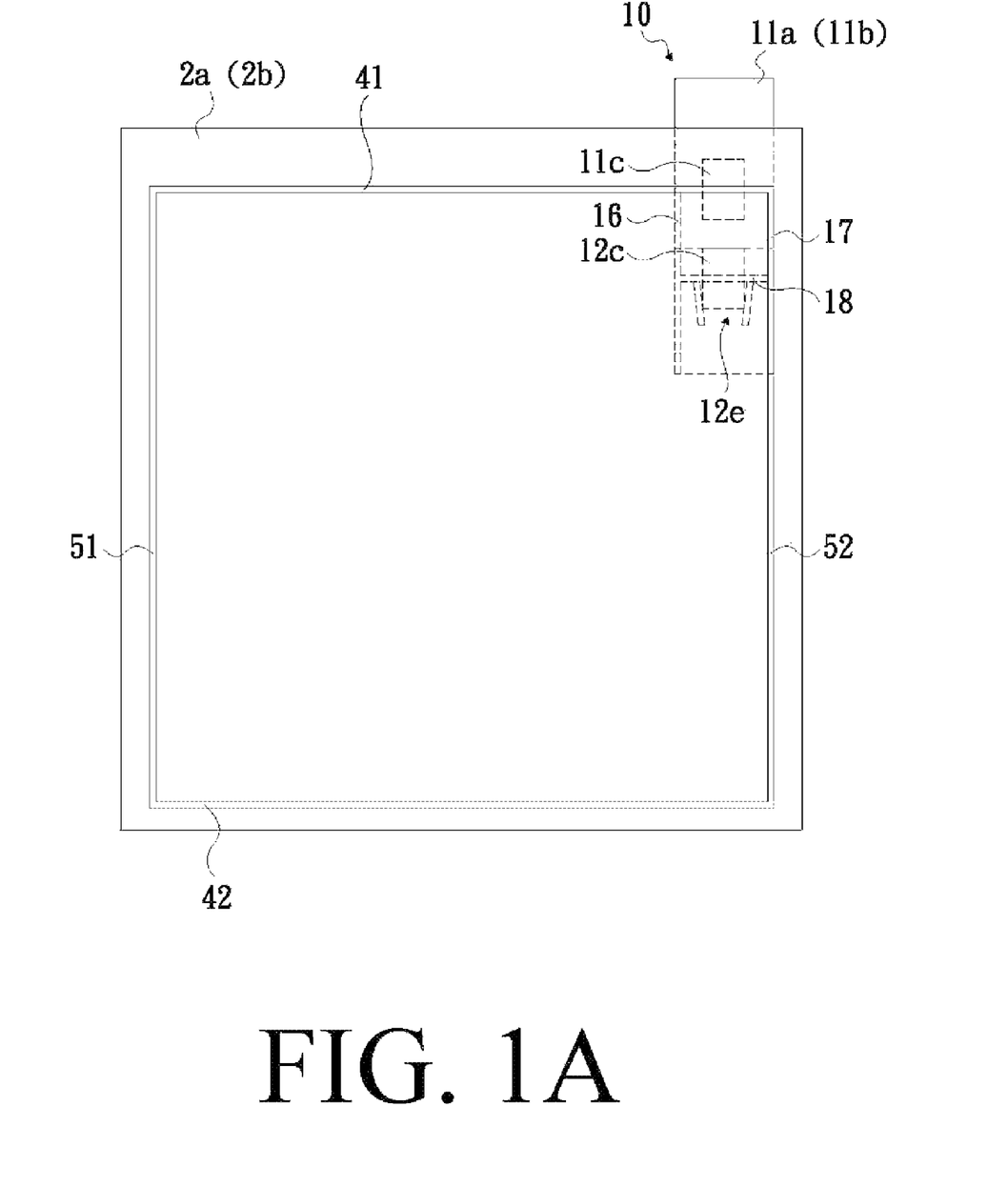
FIGS. 1A and 1B are plane views, showing an air enclosure of a first embodiment according to the present invention before being filled with air.
Figure 1B:
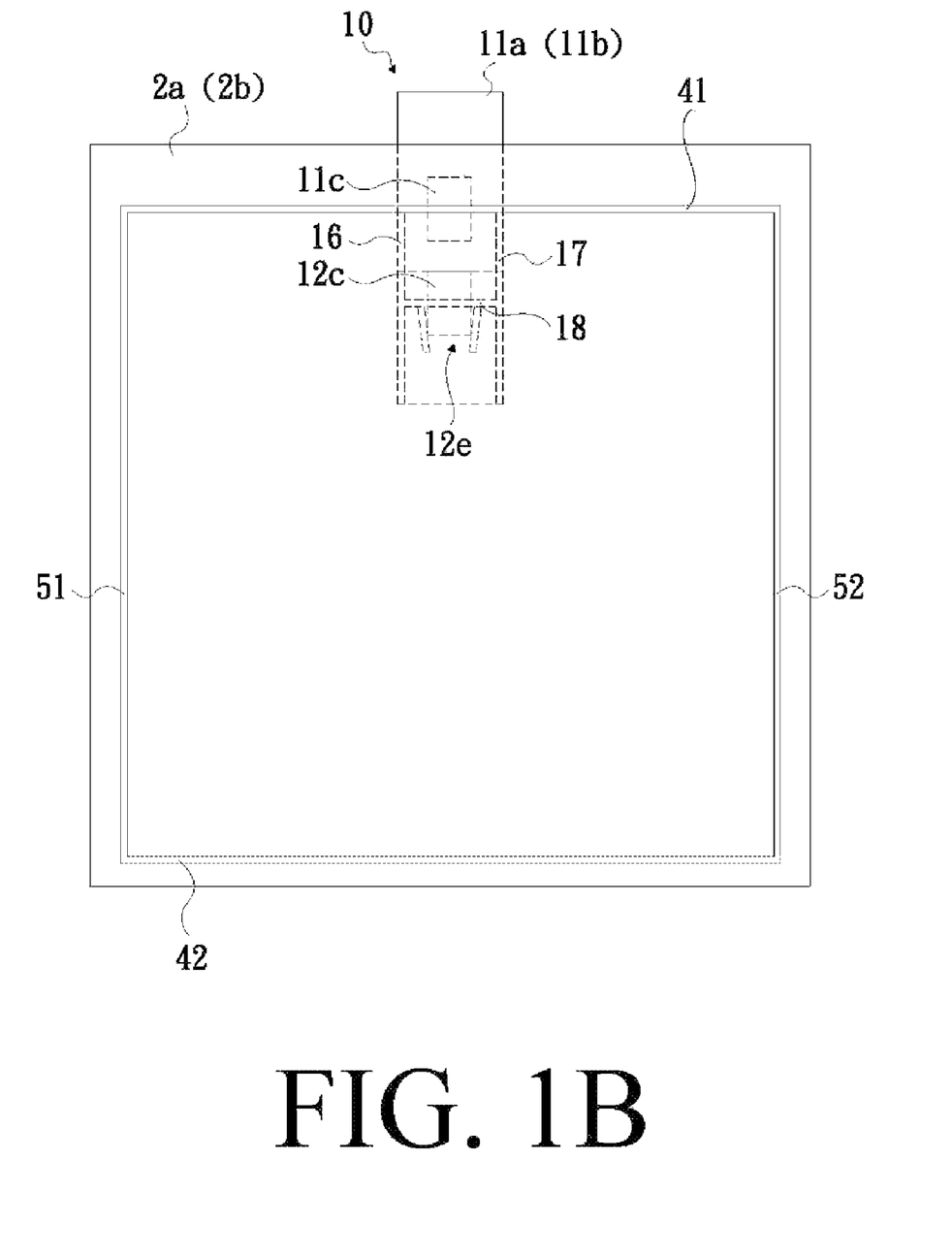
Figure 2:
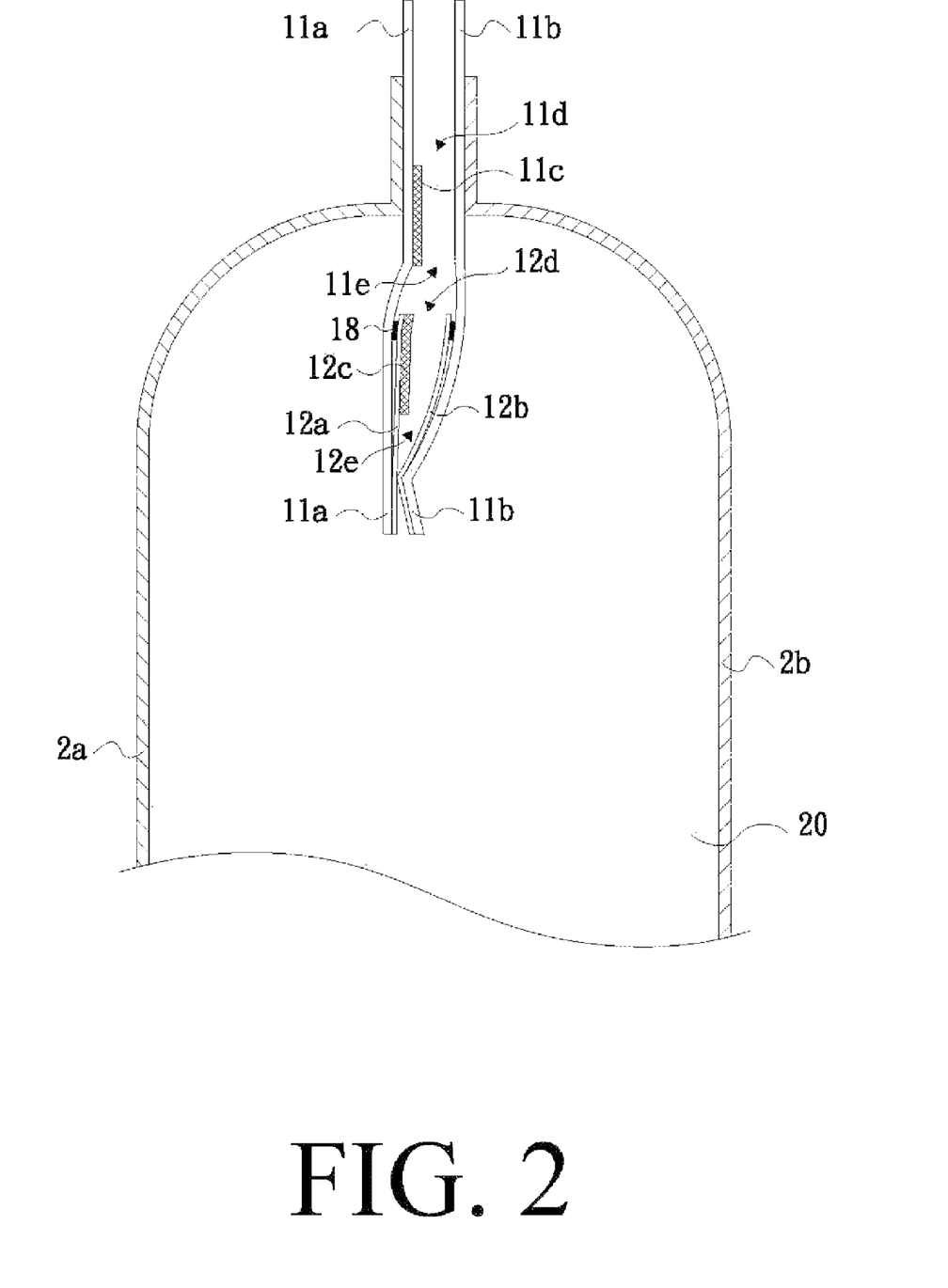
FIG. 2 is a cross sectional view, showing an air enclosure of the first embodiment according to the present invention after being filled with air.
Figure 3:
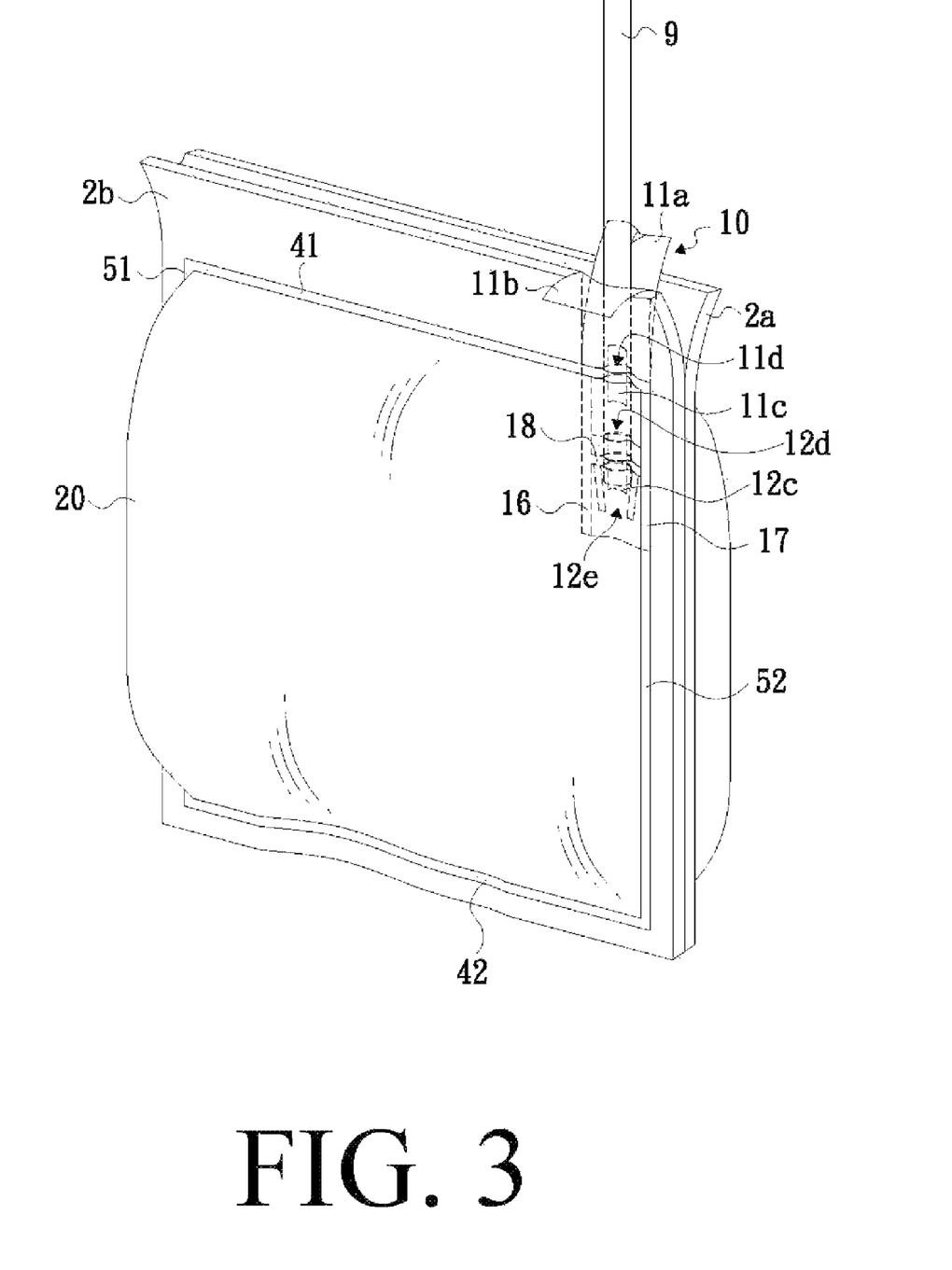
FIG. 3 is a schematic view, showing an air enclosure of the first embodiment according to the present invention after being filled with air.

Please refer to FIGS. 1A, 1B, 2 and 3. FIGS. 1A and 1B are plane views, showing an air enclosure of a first embodiment according to the present invention before being filled with air. FIG. 2 is a cross sectional view, showing an air enclosure of the first embodiment according to the present invention after being filled with air. FIG. 3 is a schematic view, showing an air enclosure of the first embodiment according to the present invention after being filled with air.

An air enclosure capable of being filled with high pressure gas includes at least one air cylinder 20 and at least one check valve 10.

The air cylinder 20 is formed between the two outer films 2a and 2b by adhering the two sheets of outer film 2a and 2b to each other by means of hot sealing along hot sealing lines 41, 42, 51 and 52. After the two sheets of outer film 2a and 2b are stacked together vertically, it is used for storing air (gas).

The check valve 10 is placed in between the two sheets of outer film 2a and 2b, and includes the two sheets of first inner film 11a and 11b and two sheets of second inner film 12a and 12b, in which parts of the two sheets of first inner film 11a and 11b respectively project from the air cylinder 20, and the width of the first inner film 11a (11b) is equal to the width of the second inner film 12a (12b), but the length of the second inner film 12a (12b) is shorter than the length of the first inner film 11a (11b). In addition, the two sheets of second inner film 12a and 12b are placed between the two sheets of first inner film 11a and 11b after being stacked together vertically, and hot sealing lines 16, 17 and 18 are used to adhere the two sheets of the two sheets of first inner film 11a and 11b and the two sheets of second inner film 12a and 12b. Furthermore, one side of the first inner film 11a (11b) is aligned with one side of the outer film 2a (2b), and they are adhered together by means of hot sealing to allow the hot sealing line 52 to be overlapped with the hot sealing line 17 as FIG. 1A, and may also allow the two sheets of first inner film 11a and 11b to be placed between the hot sealing lines 51 and 52 as FIG. 1B shows.

In the present embodiment, the two sheets of second inner films 12a and 12b are positioned between the two sheets of first inner film 11a and 11b and at the lower half thereof, i.e. the two sheets of second inner film 12a and 12b are positioned in the air cylinder 20 but the present embodiment is not limited to this. The two sheets of second inner film 12a and 12b may be placed between the two sheets of first inner film 11a and 11b depending on practical design requirements. In addition, the thickness of the first inner film 11a (11b) is larger than the thickness of the second inner film 12a (12b) but the present embodiment is not limited to this.

Two sheets of first inner film 11a and 11b are not adhered to each other at the hot sealing line 41 to form a first air inlet 11d when the two sheets of outer film 2a and 2b as well as the two sheets of first inner film 11a and 11b are adhered together by means of hot sealing along the hot sealing line 41, where a heat resistant material 11c is spread or a heat resistant pad is placed in advance between the two sheets of first inner film 11a and 11b to prevent them from adhering to each other during the hot sealing, but the present embodiment is not limited to this.

The hot sealing line 18 is used to adhere the two sheets of first inner film 11a and 11b as well as the two sheets of second inner film 12a and 12b to each other at the top ends of the two sheets of second inner film 12a and 12b or correct locations respectively close to the top ends of thereof, the two sheets of second inner film 12a and 12b are not adhered to each other at the hot sealing line 18 to form a second air inlet 12d, where the heat resistant material 12c may be spread or a heat resistant pad may be placed in advance between the two sheets of second inner film 12a and 12b to prevent them from adhering to each other during the hot sealing, but the present embodiment is not limited to this. In addition, the two sheets of second inner film 12a and 12b are adhered to each other by means of hot sealing to form a second air passageway 12e connected with the second air inlet 12d between the two sheets of second inner film 12a and 12b, where one end of the second air passageway 12e connected to the second air inlet 12d may be larger than the width of another end thereof to allow air in the second air inlet 12d to enter easily but not to escape easily. However, the shape of the second air passageway 12e is not limited to this; it may also be a curved shape, a mesh shape or a shape capable of being adjusted depending on practical design requirements.

When a user wants to fill the bag with air, they first pull the two sheets of first inner film 11a and 11b apart outward to open the first air inlet 11d. The two sheets of second inner film 12a and 12b will be forced outward to open the second air inlet 12d when the two sheets of first inner film 11a and 11b are pulled apart, because the hot sealing line 18 adheres the first inner film 11a to the second inner film 12a and the first inner film 11b to the second inner film 12b. The user inserts an air filling tool into the second air passageway 12e to fill the bag with high pressure air, and the high pressure air is fills air cylinder 20, which then expands via the second air inlet 12d and the second air passageway 12e. Internal air pressure of air cylinder 20 compresses the two sheets of first inner film 11a and 11b, as well as the two sheets of second inner film 12a and 12b to cover the second air inlet 12 and the second air passageway 12e, shielding the air cylinder 20 after the air enters, preventing air leakage and retaining the air. The check valve is protected from breakage by high pressure, while the air enters and is retained, further increasing the air filling speed to reduce the air filling time, through the design of the two sheets of first inner film 11a and 11b together with the two sheets of second inner film 12a and 12b.

One end of the check valve 10 is hung in the air cylinder 20 after the air bag is filled. The check valve 10 is able to attach closely to the air filling tool 9 because the internal air pressure of the air cylinder 20 compresses the check valve 10 when the user takes out the air filling tool 9. In the meantime the check valve 10 may be prevented from being pulled out of the air cylinder 20 after the user takes out the air filling tool 9, by virtue of the fact that one side of the two sheets of first inner film 11a and 11b is adhered to one side of the two sheets of outer film 2a and 2b by means of hot sealing.

Figure 4:
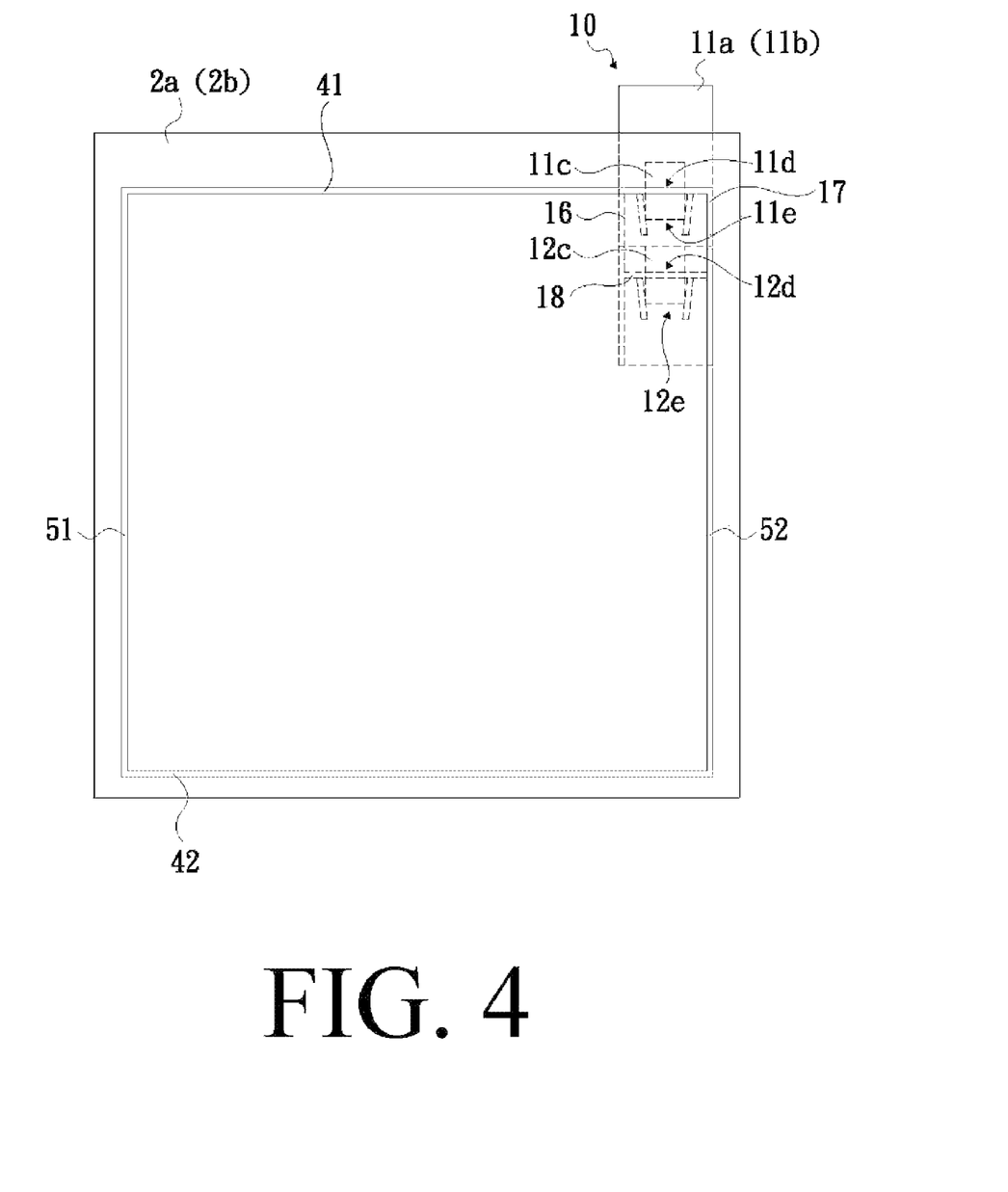
FIG. 4 is a plane view, showing an air enclosure of a second embodiment according to the present invention before being filled with air.

Please refer to FIG. 4. FIG. 4 is a plane view, showing an air enclosure of a second embodiment according to the present invention before being filled with air.

In the present embodiment, the two sheets of first inner film 11a and 11b may also be adhered to each other by means of hot sealing to form a first air passageway 11e connected to the first air inlet 11d between the two sheets of first inner film 11a and 11b, in which the width of one end of the first air passageway 11e connected to the first air inlet 11d may be larger than the width of another end thereof to allow air in the first air inlet 11d to enter easily but not to escape easily. However, the shape of the first air passageway 11e is not limited to this; it may be a curved shape, a mesh shape or a shape capable of being adjusted depending on practical design requirements.

Figure 5:
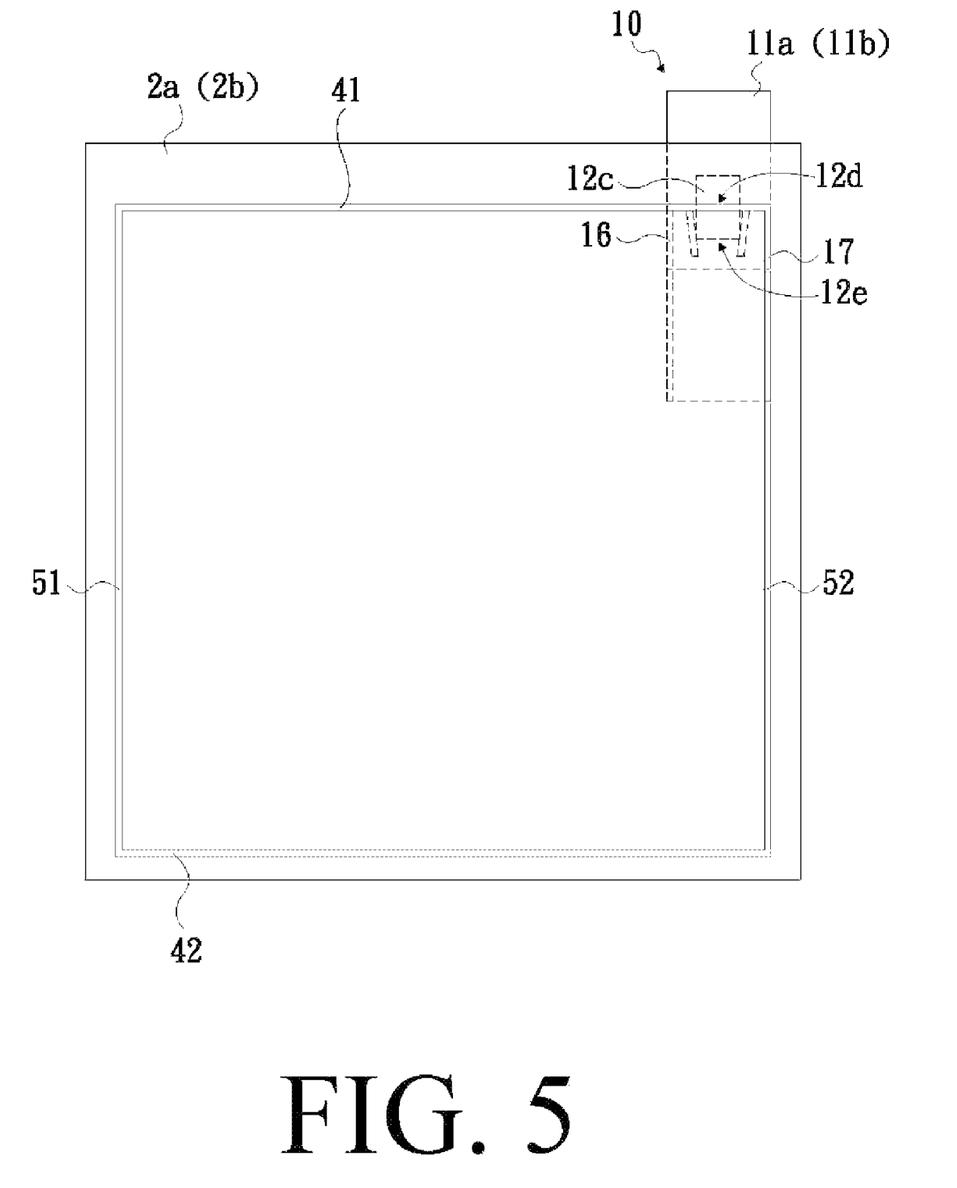
FIG. 5 is a plane view, showing an air enclosure of a third embodiment according to the present invention before being filled with air.
Figure 6:
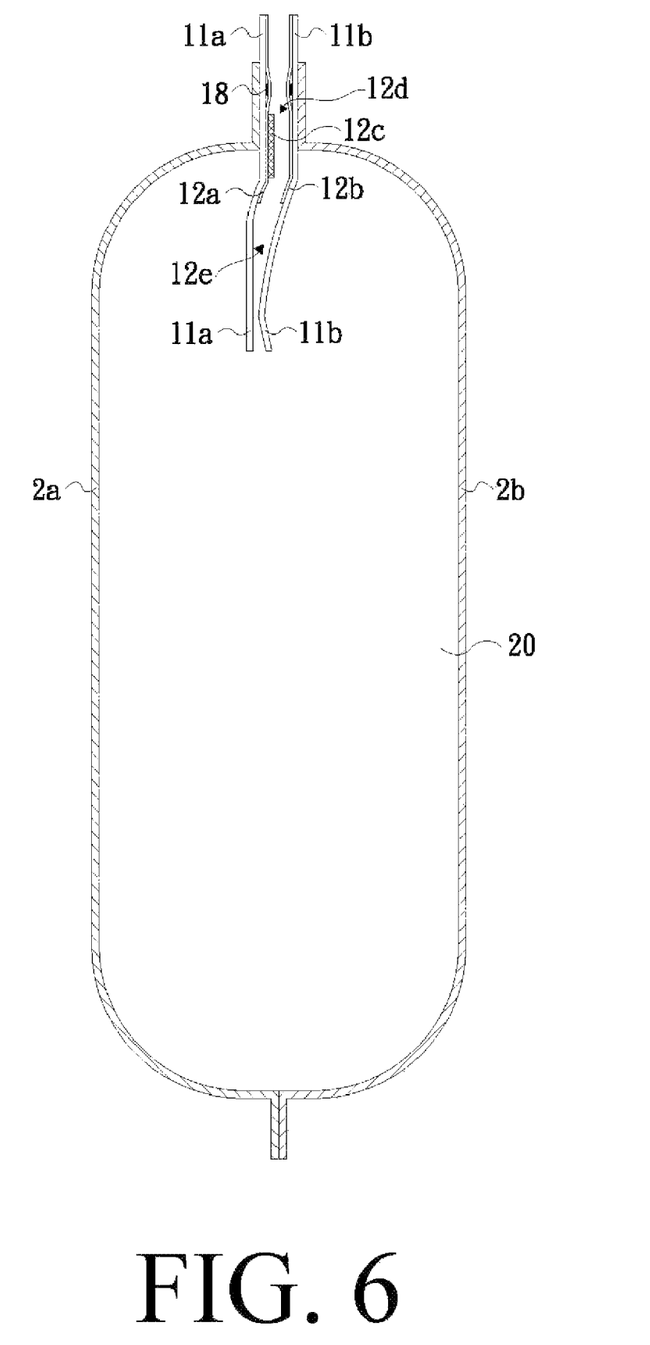
FIG. 6 is a cross sectional view, showing an air enclosure of the third embodiment according to the present invention after being filled with air.

FIG. 5 is a plane view, showing an air enclosure of a third embodiment according to the present invention before being filled with air. FIG. 6 is a cross sectional view, showing an air enclosure of the third embodiment according to the present invention after being filled with air.

The two sheets of second inner film 12a and 12b are positioned between the two sheets of first inner film 11a and 11b at the upper half part thereof, i.e. at least one part of the two sheets of second inner film 12a and 12b projects from the air cylinder 20, where the top ends of the two sheets of second inner film 12a and 12b are aligned with the top ends of the two sheets of first inner film 11a and 11b, and the bottom ends of the two sheets of second inner film 12a and 12b are positioned in the air cylinder 20. The present invention does not include the structure of the first air inlet 11d in the first embodiment.

When a user wants to fill the bag with air, they first pull the two sheets of second inner film 12a and 12b apart outward to open the second air inlet 12d, and then insert the air filling tool 9 between the two sheets of second inner film 12a and 12b to fill the bag with high pressure air. The high pressure air is enters the air cylinder via the second air passageway 12e, causing the air cylinder 20 to be filled with air and expanded. Internal air pressure of the air cylinder 20 compresses the two sheets of first inner film 11a and 11b as well as the two sheets of second inner film 12a and 12b after the air enters, to cover the second air inlet 12d and the second air passageway 12e to shield the air cylinder 20, preventing air leakage and retaining the air.

Figure 7:
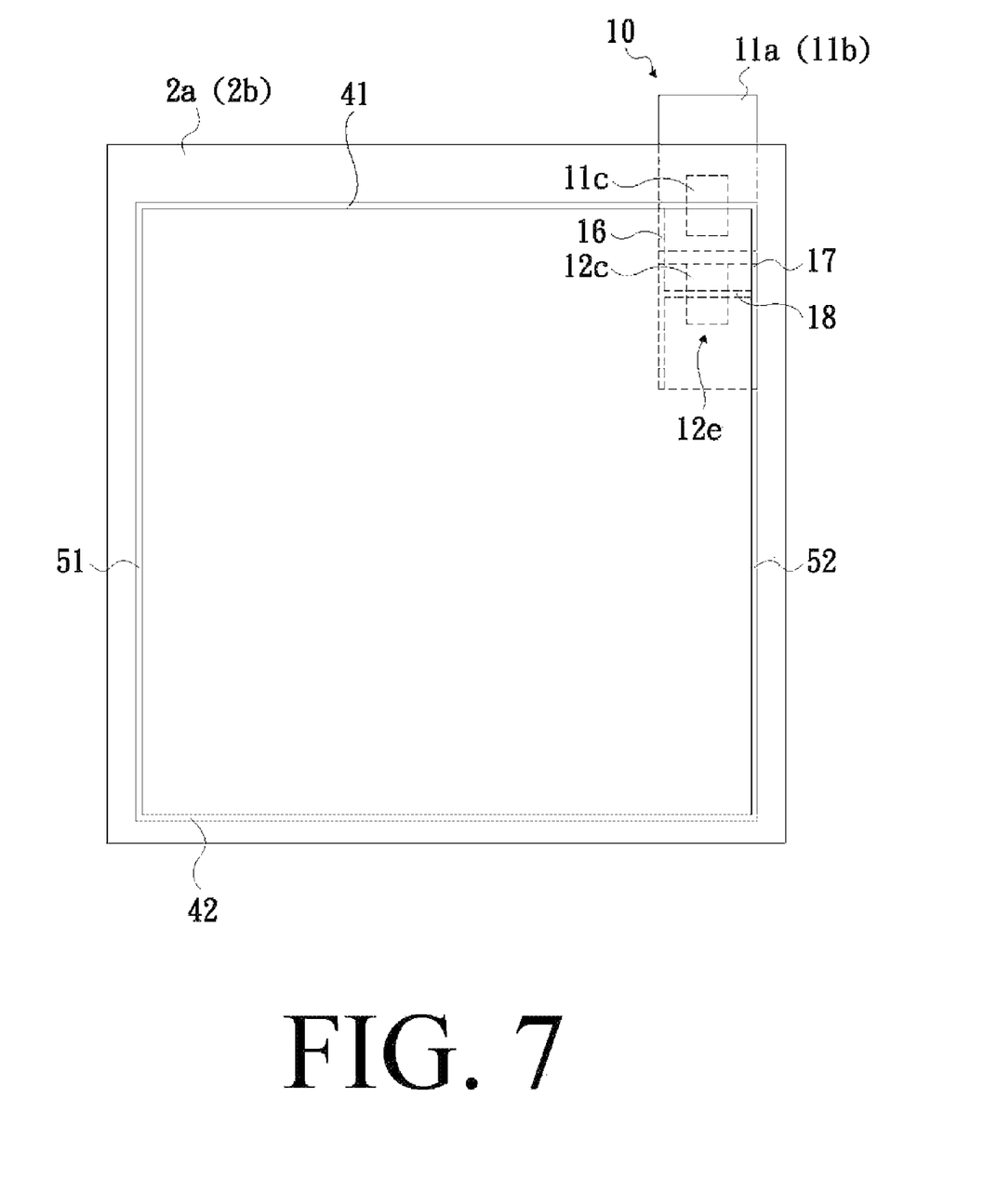
FIG. 7 is a plane view, showing an air enclosure of a fourth embodiment according to the present invention before being filled with air.
Figure 8:
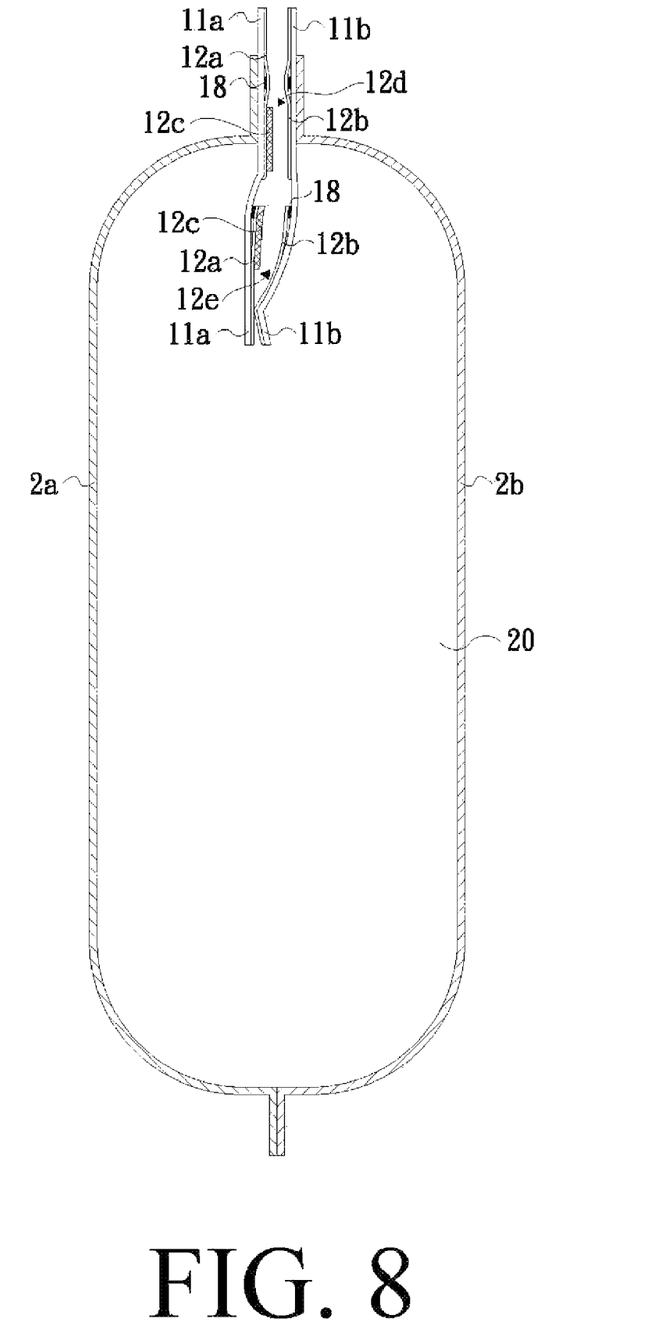
FIG. 8 is a cross sectional view, showing an air enclosure of the fourth embodiment according to the present invention after being filled with air.

FIG. 7 is a plane view, showing an air enclosure of a fourth embodiment according to the present invention before being filled with air. FIG. 8 is a cross sectional view, showing an air enclosure of the fourth embodiment according to the present invention after being filled with air.

Two sets of the two sheets of second inner film 12a and 12b respectively may be positioned between the two sheets of first inner film 11a and 11b at the upper half part and the lower half part thereof, i.e. a part of one set of the two sheets of second inner film 12a and 12b among them projects from the air cylinder 20 and another part thereof is placed in the air cylinder 20, and another set of the two sheets of second inner film 12a and 12b is placed below the aforementioned set of the two sheets of second inner film 12a and 12b and completely in the air cylinder 20.

Figure 9:
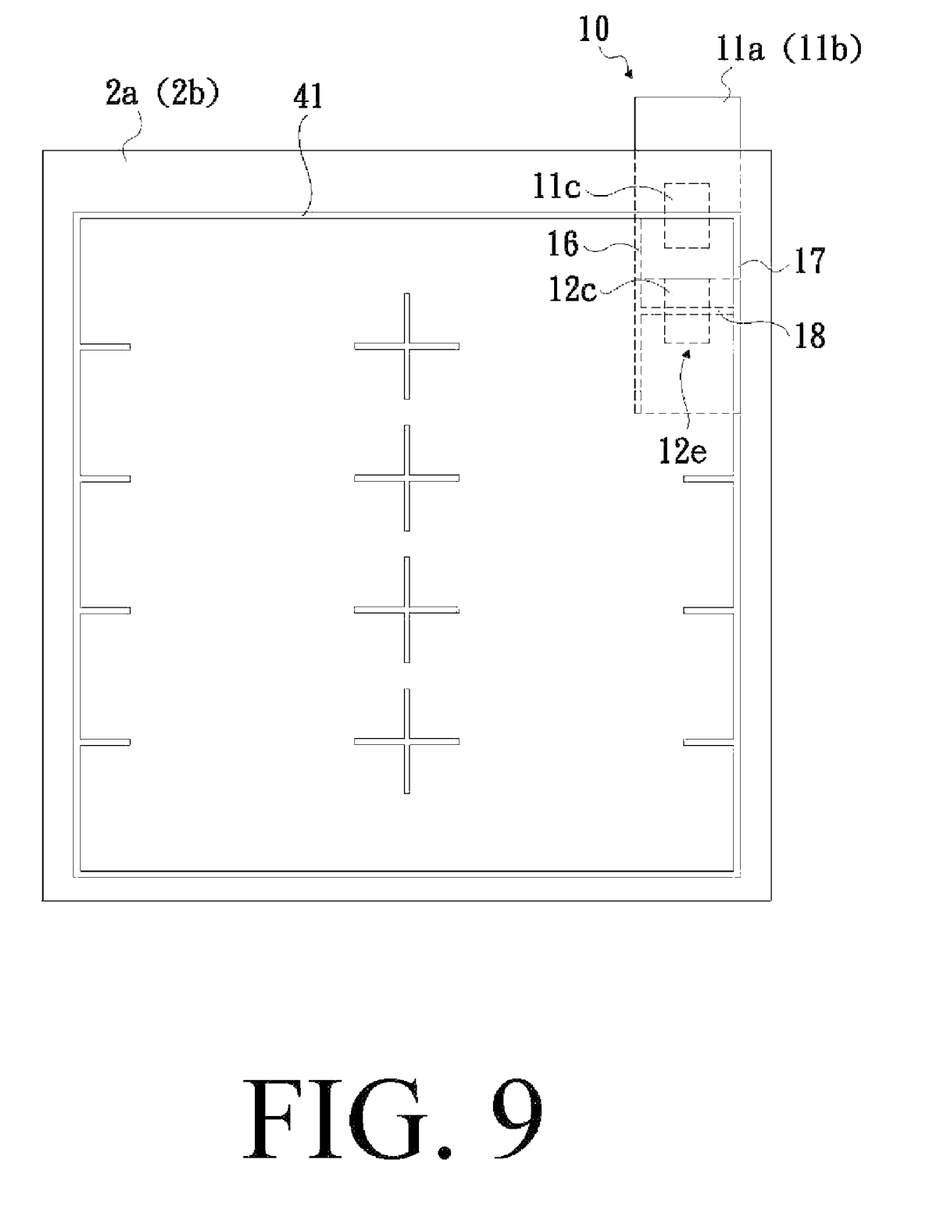
FIG. 9 is a plane view, showing an air enclosure of a fifth embodiment according to the present invention before being filled with air.
Figure 10:
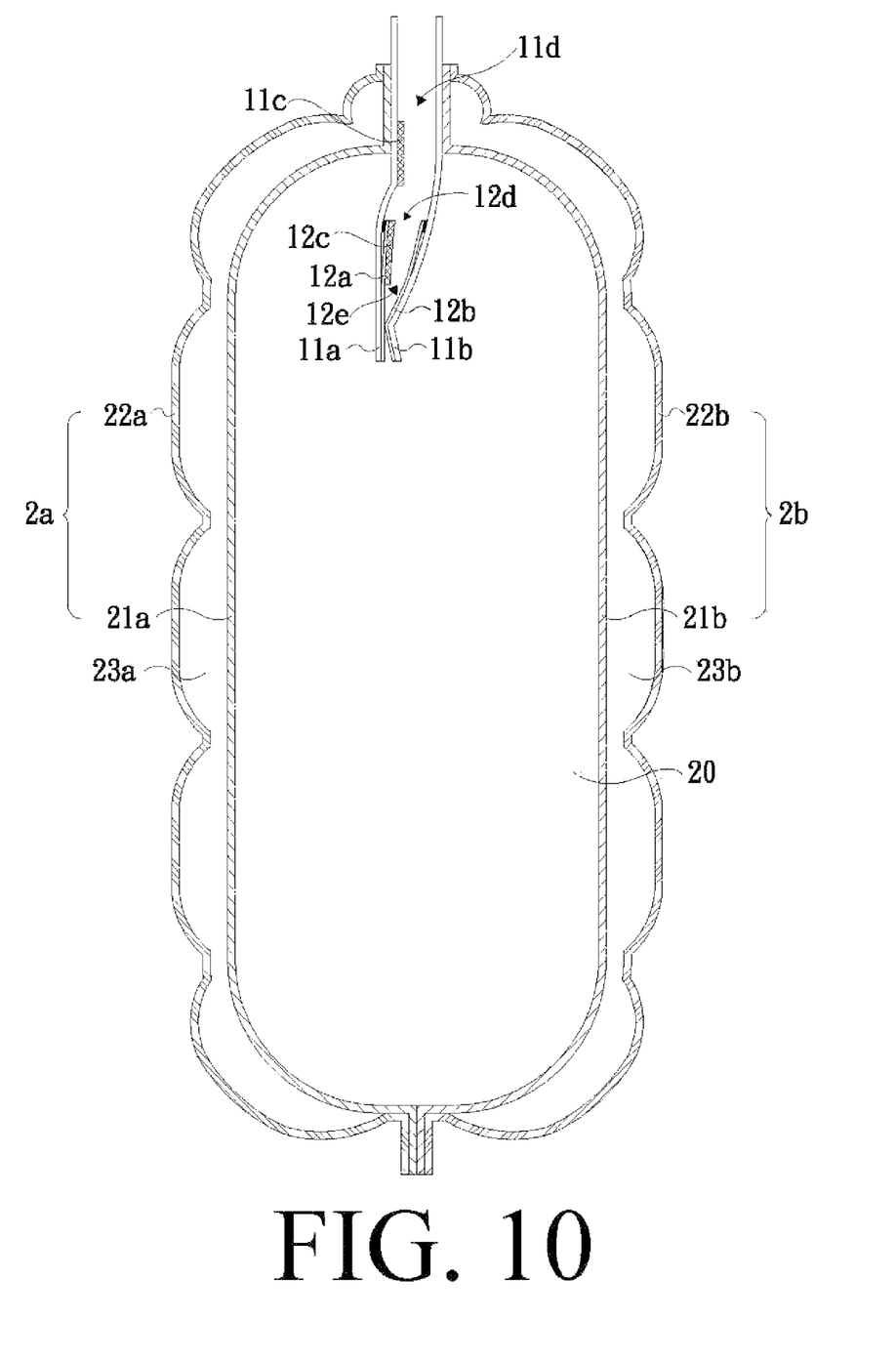
FIG. 10 is a cross sectional view, showing an air enclosure of the fifth embodiment according to the present invention after being filled with air.

FIG. 9 is a plane view, showing an air enclosure of a fifth embodiment according to the present invention before being filled with air. FIG. 10 is a cross sectional view, showing an air enclosure of the fifth embodiment according to the present invention after being filled with air.

In the present embodiment, the outer film 2a constitutes film sheets 21a and 22a, and the outer film 2b constitutes two film sheets 21b and 22b, where the film sheets 21a and 22a may be hot-sealed to cause parts of the area thereof to adhere to each other, and the film sheets 21b and 22b may be hot-sealed to cause parts of the area thereof to be adhere to each other so as to strengthen the structure of the two sheets of outer film 2a and 2b, and preventing the two sheets of outer film 2a and 2b from being pierced by a sharp article and subsequently leaking.

In addition, the film sheets 21a and 22a may be formed with an air storable auxiliary air chamber 23a by means of hot sealing, and the film sheets 21b and 22b may be formed with an air storable auxiliary air chamber 23b by means of hot sealing, thereby strengthening the cushioning protection effect, and ensuring that the cushioning protection effect of the air cylinder 20 will also not be lost if auxiliary air chambers 23a or 23b are pierced.

Two first inner and two second inner films stacked together are used to form a check valve in an air enclosure capable of being filled with high pressure air according to the present invention, where the two second inner films are stacked together between the two first inner films thereby strengthening the strength of the check valve to allow the air cylinder to be filled with high pressure air via the check valve, to enabling the air cylinder to be filled with air and expanded quickly without breaking the check valve with high pressure during the air filling process, to ensure air retention, and further increasing the air filling speed, thus reducing the air filling time. In addition, the present invention may use a plurality of film sheets independent of one another and not glued to one another to form an outer film, thereby strengthening the strength of the outer film. Hence, the cushioning protection effect will not be lost if a film sheet is broken.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air enclosure capable of being filled with high pressure air, comprising:
   two outer films;
   at least one air cylinder, formed between the two outer film by adhering the two outer films to each other by means of hot sealing;
   two first inner films, placed in between the two outer films, parts of the two first inner films projecting from the air cylinder;
   two second inner films, placed in between the two first inner films; and
   at least one second air inlet, formed between the second inner films by adhering the two second inner films to each other by means of hot sealing, high pressure air entering the second air inlet through an air filling tool into the air cylinder, causing the air cylinder to fill with air and expand.

2. The air enclosure is capable of being filled with high pressure air according to claim 1, wherein the outer film comprises a plurality of film sheets, and the plurality of film sheets are adhered to one another by means of hot sealing to form at least one auxiliary air chamber among the plurality of film sheets.

3. The air enclosure capable of being filled with high pressure air according to claim 1, wherein one side of the first inner films is aligned with one side of the outer films and adhered to the side of the outer films by means of hot sealing.

4. The air enclosure capable of being filled with high pressure air according to claim 1, further comprising at least one first air inlet, formed between the first inner films by adhering the first inner films to each other by means of hot sealing.

5. The air enclosure capable of being filled with high pressure air according to claim 4, wherein one of a heat resistant material and a heat resistant pad is spread or placed between the first inner films to form the first air inlet by adhering the first inner films to each other by means of hot sealing.

6. The air enclosure capable of being filled with high pressure air according to claim 4, further comprising at least one first air passageway connected to the first air inlet and formed between the first inner films by adhering the first inner films to each other by means of hot sealing.

7. The air enclosure capable of being filled with high pressure air according to claim 1, wherein at least one part of the second inner films projects from the air cylinder.

8. The air enclosure capable of being filled with high pressure air according to claim 1, wherein the second inner films are positioned in the air cylinder.

9. The air enclosure capable of being filled with high pressure air according to claim 1, wherein one of a heat resistant material and a heat resistant pad is spread or placed between the second inner films to form the second air inlet by adhering the second inner films to each other by means of hot sealing.

10. The air enclosure capable of being filled with high pressure air according to claim 1, further comprising at least one second air passageway connected to the second air inlet and formed between the second inner films by adhering the second inner films to each other by means of hot sealing.

11. A check valve capable of being filled with high pressure air, assembled in at least one air cylinder formed by adhering two outer to each other films by means of hot sealing, the check valve comprising:

two first inner films, placed in between the two outer films, parts of the two first inner films projecting from the air cylinder;

two second inner films, placed in between the two first inner films; and at least one second air inlet, formed between the second inner films by adhering the two second inner films to each other by means of hot sealing, high pressure air being forced into the second air inlet through an air filling tool and into the air cylinder, causing the air cylinder to fill with air and expand.

12. The check valve capable of being filled with high pressure air according to claim 11, wherein one side of the first inner films is aligned with one side of the outer films and adhered to the side of the outer films by means of hot sealing.

13. The check valve capable of being filled with high pressure air according to claim 11, further comprising at least one first air inlet, formed between the first inner films by adhering the first inner films to each other by means of hot sealing.

14. The check valve capable of being filled with high pressure air according to claim 13, wherein one of a heat resistant material and a heat resistant pad is spread or placed between the first inner films to form the first air inlet by adhering the first inner films to each other by means of hot sealing.

15. The check valve capable of being filled with high pressure air according to claim 13, further comprising at least one first air passageway connected to the first air inlet and formed between the first inner films by adhering the first inner films to each other by means of hot sealing.

16. The check valve capable of being filled with high pressure air according to claim 11, wherein at least one part of the second inner films projects from the air cylinder.

17. The check valve capable of being filled with high pressure air according to claim 11, wherein the second inner films are positioned in the air cylinder.

18. The check valve capable of being filled with high pressure air according to claim 11, wherein one of a heat resistant material and a heat resistant pad is spread or placed between the second inner films to form the second air inlet by adhering the second inner films to each other by means of hot sealing.

19. The check valve capable of being filled with high pressure air according to claim 11, further comprising at least one second air passageway connected to the second air inlet and formed between the second inner films by adhering the second inner films to each other by means of hot sealing.

* * * * *